United States Patent [19]
Tsao

[11] Patent Number: 5,738,524
[45] Date of Patent: Apr. 14, 1998

[54] MULTI-FUNCTION TEACHING GAME BOX

[76] Inventor: Chin-Chen Tsao, No. 152, Tung Pei Street, Chung Shan Distric, Taipei City, Taiwan

[21] Appl. No.: 816,242

[22] Filed: Mar. 13, 1997

[51] Int. Cl.⁶ .................................................. G09B 1/06
[52] U.S. Cl. ................................. 434/210; 434/191
[58] Field of Search ........................... 434/210, 205, 434/191, 188, 208, 207

[56] References Cited

U.S. PATENT DOCUMENTS

1,826,034  10/1931  Williamson ........................ 434/210
3,151,404  10/1964  Schott ............................... 434/191
3,908,287   9/1975  Darnell .......................... 434/210 X
3,995,378  12/1976  Darnell .......................... 434/210 X

*Primary Examiner*—Jeffrey A. Smith
*Attorney, Agent, or Firm*—Pro-Techtor International

[57] ABSTRACT

A multi-function teaching game box that provides a simple addition and subtraction mathematical calculation for children while playing. Moreover, the structural design of the present invention allows children to comprehend the concept of, and become accustom to, the idea of carry over. The game box includes a container, a lid and a plurality of cubes.

3 Claims, 15 Drawing Sheets

MULTI-FUNCTION TEACHING GAME BOX

BACKGROUND OF THE INVENTION

The present invention is a multi-function teaching game box that functions not only as toy blocks, but also as a simple addition and subtraction exercise for children. The device allows children to comprehend the concepts of mathematical calculations while playing.

Throughout time, a natural instinct to pursue knowledge has existed in mankind. This natural phenomenon is reflected even more obviously in children. By providing the right tools during the peak of a child's learning capability, children can receive unlimited, effective brain exercise while playing, thereby gaining knowledge. As is common knowledge, most toys are incapable of guiding children to learn effectively during their daily play.

Thus, how to simply and precisely utilize a structure to offer safety and at the same time, amusement and knowledge, is an issue that both parents and educators have long considered.

SUMMARY OF THE INVENTION

The main purpose of the present invention is to provide a multi-function teaching game box with cubes placed inside a number of columns within the game box, allowing simple addition and subtraction calculations. The stopper lid forces the cubes to be arranged vertically from bottom to top until the tenth cube, which must be placed in the next column to the left. This illustrates the concept of carrying over to the next place, thereby offering math practice.

BRIEF DESCRIPTION OF THE DRAWINGS

FIG. 1-A is a cube (1) of the present invention.

FIGS. 3-A and 3-B illustrate the carry over scenario of the present invention.

FIGS. 4-A and 4-B illustrate the addition scenario of the present invention.

FIGS. 5-A and 5-B illustrate the subtraction scenario of the present invention.

FIGS. 6-A, 6-B and 6-C illustrate another addition scenario of the present invention.

FIGS. 7-A, 7-B and 7-C illustrate another subtraction scenario of the present invention.

DETAILED DESCRIPTION OF THE PREFERRED EMBODIMENT

Figure 1:
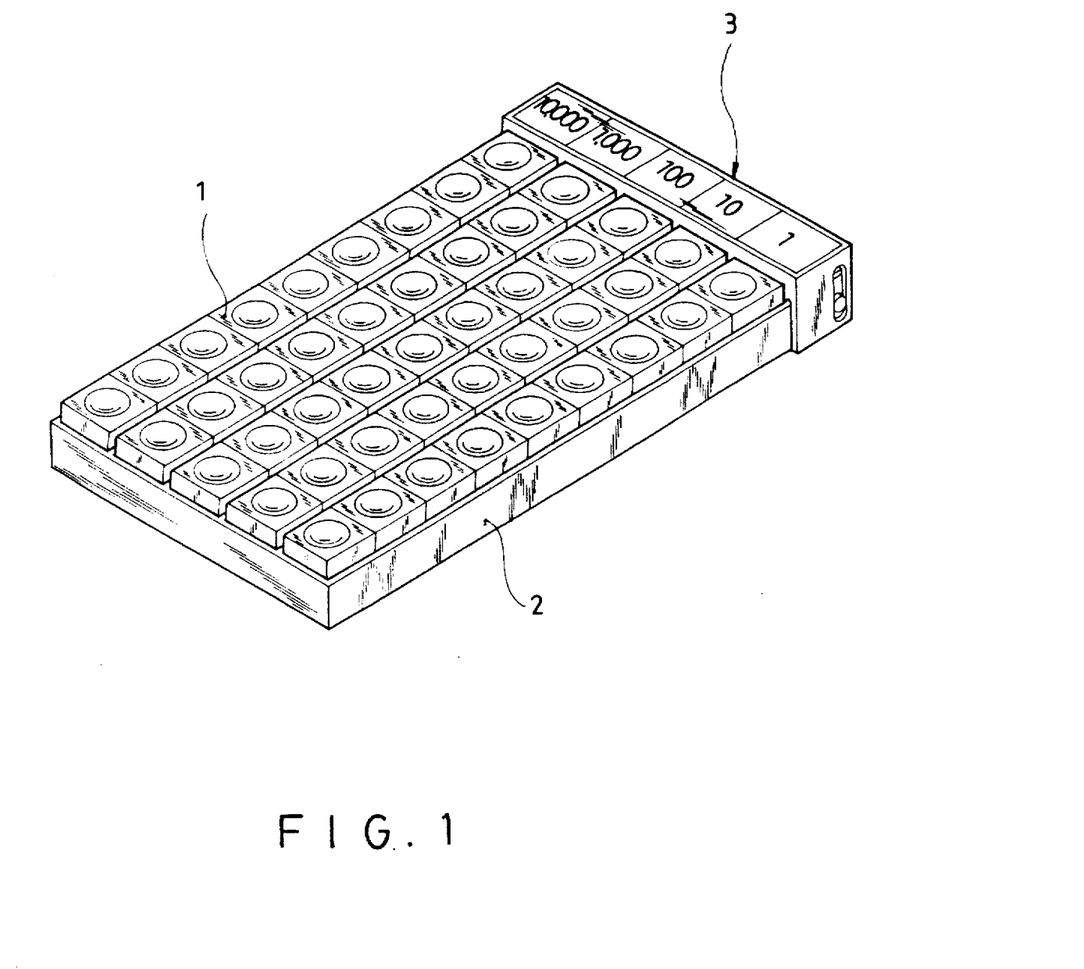
FIG. 1 is a perspective view of the present invention.
Figure 2:
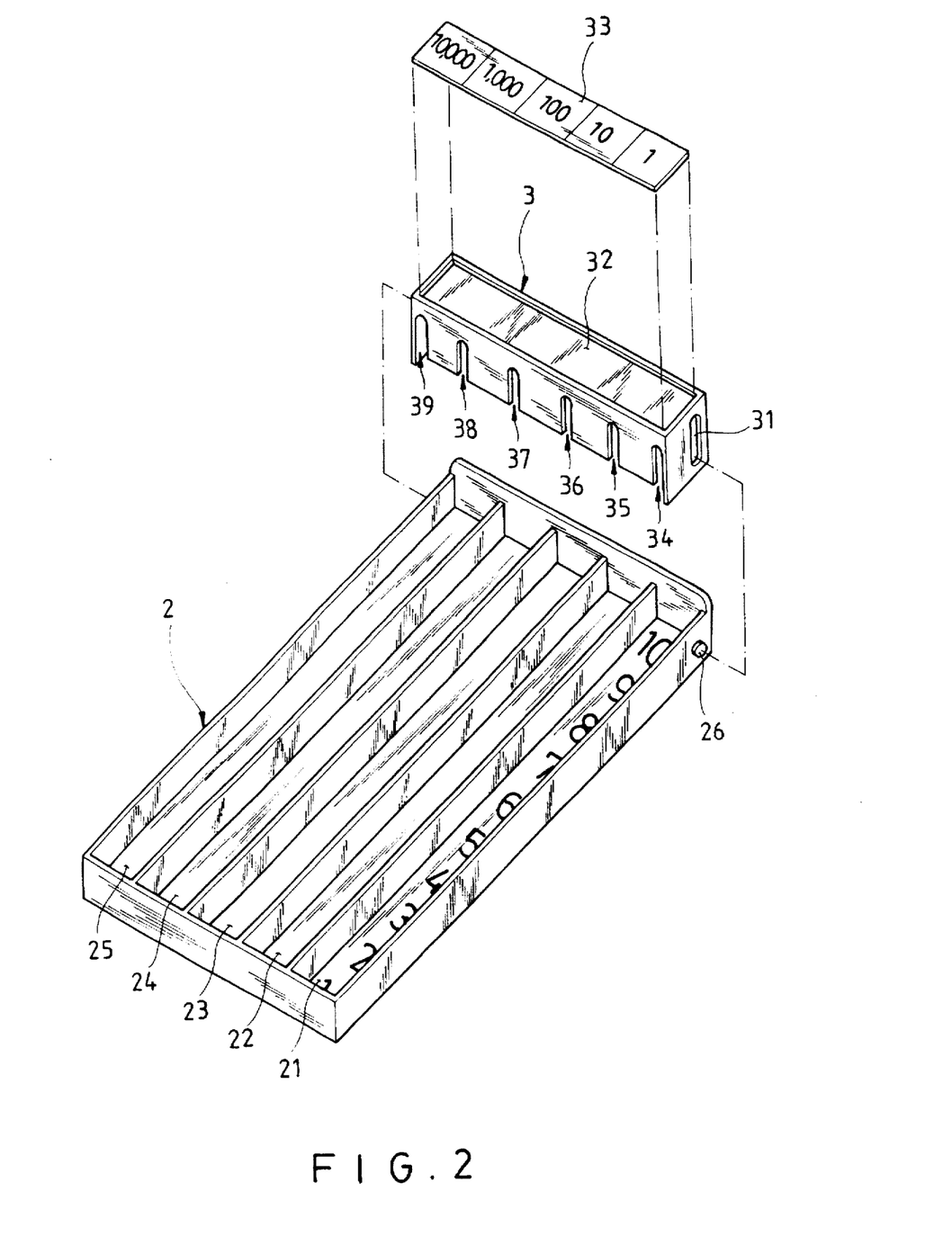
FIG. 2 is an exploded view of the present invention.

Please refer to FIG. 1. The present invention comprises a plurality of cubes (1), a cube container (2), and a stopper lid (3). The cube (1), illustrated in FIG. 1-A, includes rounded corners for ease of handling. A shallow depression (11) is located in the center of one of the six sides of the cube (1). The cube container (2), shown in FIG. 2, is provided with five columns (21), (22), (23), (24) and (25). Inside the rightmost column (21), numbers 1 to 10 are marked from bottom to top. On the right and left sides of the upper end of the cube container (2), a circular protruding post (26) is provided. Each column of the cube container (2) can hold up to 10 cubes (1), which sums up to fifty cubes (1) in total.

The stopper lid (3) is a rectangular frame, with elliptical slits (31) on both the left and right side. Moreover, a plate fixture trough (32) is built on top of the stopper lid (3). A designation plate (33) is fixed onto the plate fixture trough (32). The designation plate (33) is labeled with "1", "10", "100", "1,000", and "10,000" to correspond to the five columns. The designation plate (33) can further be differentiated by the colors of the squares. A plurality of slit openings (34), (35), (36) (37), (38) and (39) are cut out on the front side of the stopper lid (3). The elliptical slits (31) on the stopper lid (3) are mounted on the circular protruding posts (26) of the cube container (2).

Figure 3:
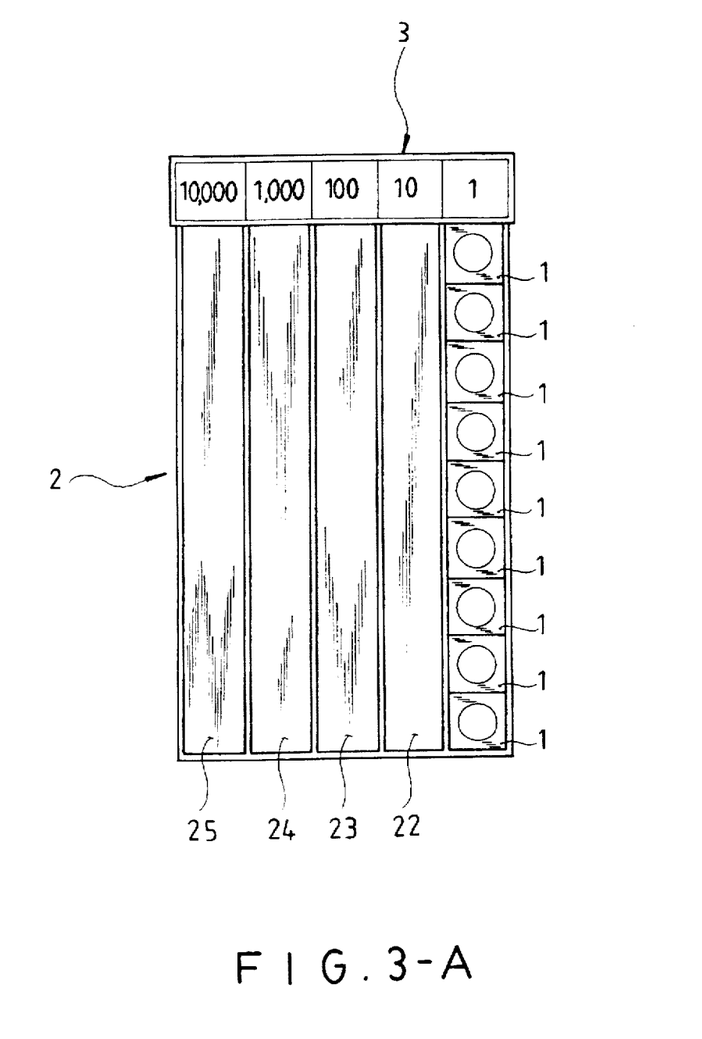

FIGS. 3-A and 3-B illustrate the top view of the present invention, when cubes (1) are piled up to the ninth space from bottom to top in the right most column (21). When the user desires to add another (the tenth) cube, the number of cubes in a given column is limited to nine by the stopper lid (3). The added cube must therefore be moved to the next left column (22) (the tens place) as a carry over. Further additions can be done in the same way, ones place is carried over to tens place in sequence; then from tens place carry over to hundreds place; then from hundreds place carry over to thousands place; then finally from thousands place carry over to ten thousands place.

Figure 4:
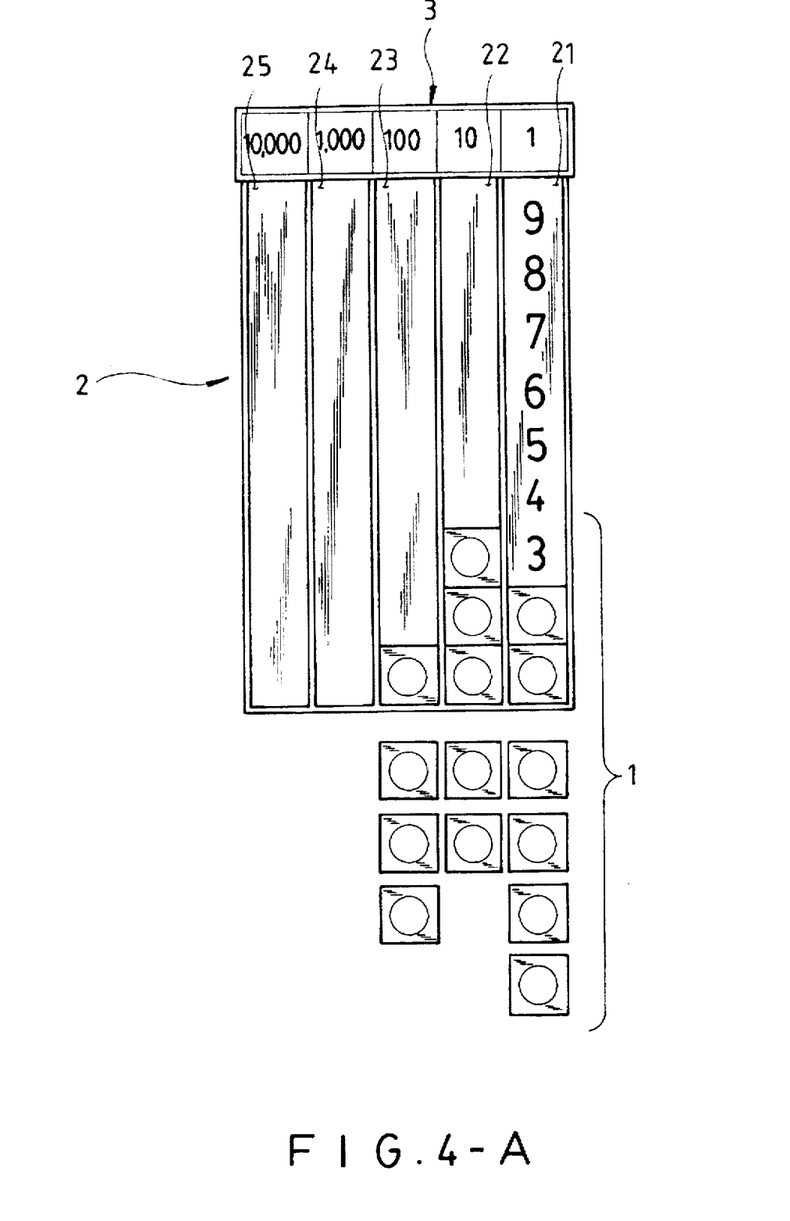

FIGS. 4-A and 4-B illustrate an "addition" operation scenario of adding 132 to 324. First place a cube (1) into the hundreds place column (23), three cubes (1) into the tens place column (22), two cubes (1) into the ones place column (21). Then place three cubes (1) below the hundreds place column (23), two cubes (1) below the tens place column (22), and four cubes (1) below the ones place column (21). Next take the three cubes (1) below the hundreds place column (23) and place them above the cubes inside the hundreds place column (23), take the two cubes (:1) below the tens place column (23) and place them above the three cubes inside the tens place column (22), and take the four cubes (:1) below the ones place column (21) and place them above the two cubes inside the ones place column (21). This leads to the result shown in FIG. 4-B. The hundreds place column (23) now has four cubes (1), the tens place column (22) has five cubes (1), and the ones place column (21) has six cubes (1). The end result from the arrangement process as described above agrees with the mathematical calculation of 132+324=456.

Figure 5:
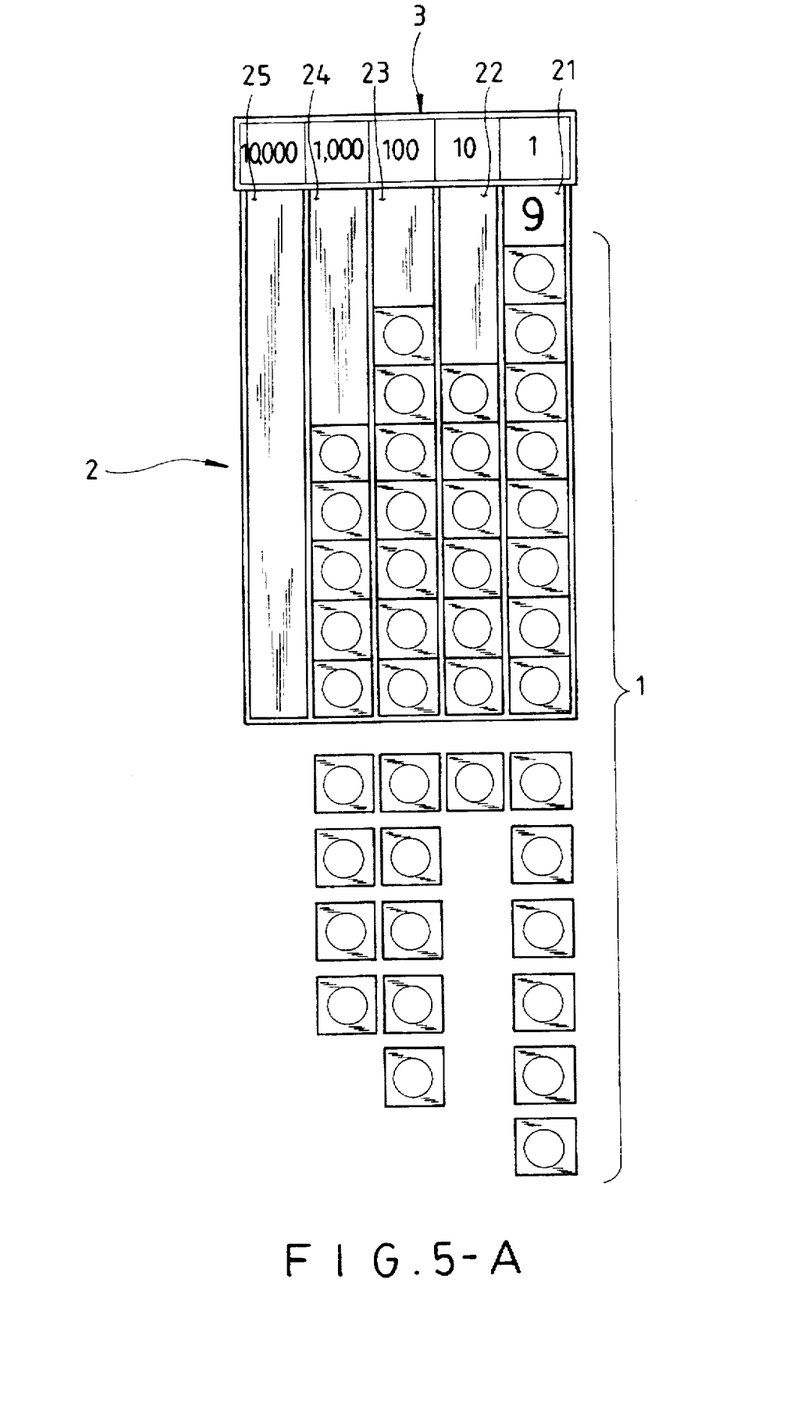

FIGS. 5-A and 5-B illustrate a "subtraction" operation scenario of 5,768–4,516. First place five cubes (1) into the thousands place column (24), seven cubes (1) into the hundreds place column (23), six cubes (1) into the tens place column (22), and eight cubes (1) into the ones place column (21). Then place four more cubes (1) below the thousands place column (24), five cubes (1) below the hundreds place column (23), one cube (1) below the tens place column (22), and six cubes (1) below the ones place column (21). Then take out a number of cube(s) (1) from each column equal to the number of cubes below the column, which results in the configuration shown in FIG. 5-B. The thousands place column (24) is left with one cube (1), the hundreds place column (24) is left with two cubes (1), the tens place column (22) is left with five cubes (1), and the ones place column (21) is left with two cubes (1). The end result from the process as described above agrees with the mathematical calculation of 5768–4516=1252.

Figure 6:
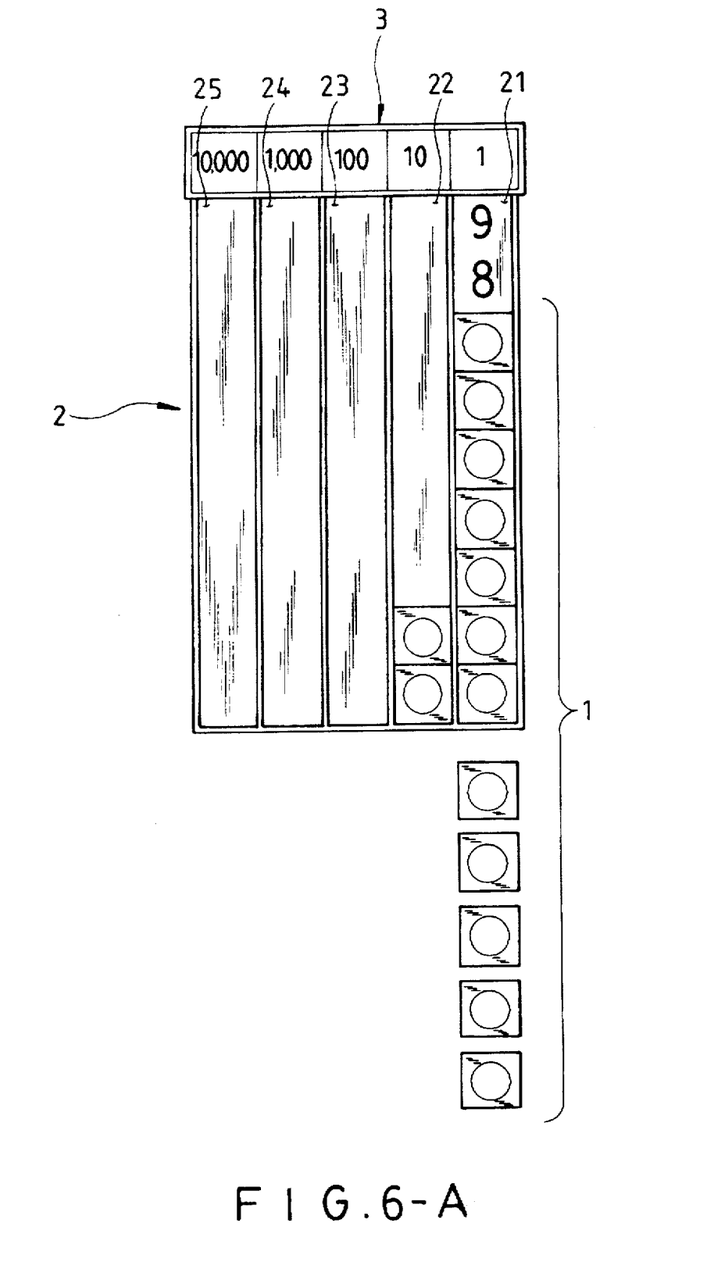

FIGS. 6-A, 6-B and 6-C illustrate another "addition" operation, adding 27 to 5. First place two cubes (1) into the tens place column (22), and seven cubes (1) into the ones place column (21). Then place five cubes (1) below the ones place column (21). Remove the five cubes (1) below the ones place column (21) and place them on top of the seven cubes inside the ones place column (21). Because the stopper lid (3) limits a column to nine cubes (1), the tenth cube (1) is carried over to the left and placed on top of the two cubes in the tens place column (22). Next remove the nine cubes (1) in the ones place column (21), leaving two cubes (1) still placed below the ones place column (21), which leads to the result shown in FIG. 6-C. The tens place column (22) now has three cubes (1), and the ones place column (21) has two cubes (1). The end result from the process described above agrees with the mathematical calculation of 27+5=32.

Figure 7:
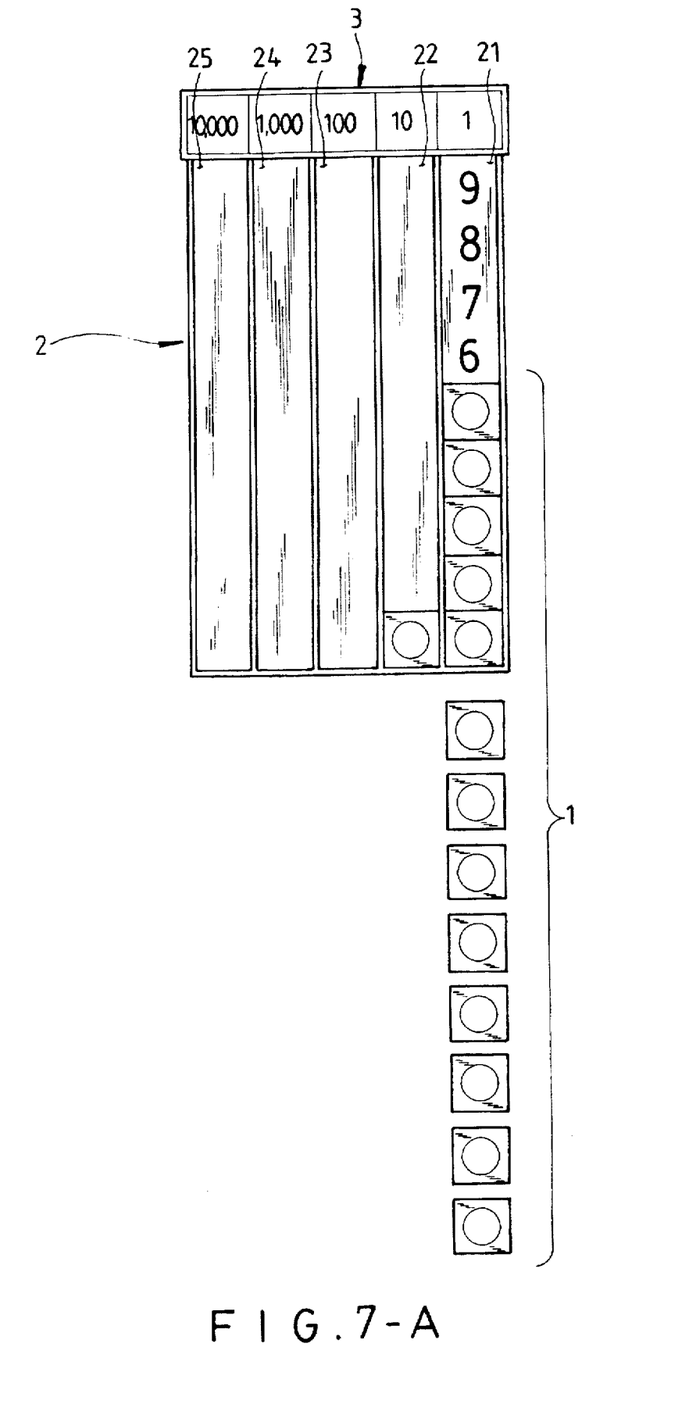

FIGS. 7-A, 7-B and 7-C illustrate another "subtraction" operation, 15–8. First place one cube (1) into the tens place column (22), and five cubes (1) into the ones place column (21), then place eight cubes (1) below the ones place column (21). Because there are only five cubes (1) inside the ones place column (21), which is less than the eight cubes (1) below the ones place column (21), move the cube (1) in the tens place column (22) to the right to exchange for ten cubes (1) in the ones column (as shown in FIG. 7-B). Then remove cubes (1) equal in number to the cubes (1) below the ones place column (21), leaving two cubes (1) purposely. Then place them in the ones place column (21) that already contains the five cubes (1), which results in the configuration shown in FIG. 7-C. The ones place column now has seven cubes (1). The end result from the process as described above agrees with the mathematical calculation of 15–8=7.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A multi-function teaching game box comprising:

a plurality of cubes (1), a cube container (2) including a plurality of columns, at least one of said columns contains markings for numbers 1 to 10, said markings are spaced according to a size of said cubes (1), and said columns are of a length chosen so as to hold no more than ten of said cubes (1), a stopper lid (3) with means to movably fasten said stopper lid (3) to an upper end of said cube container (2), a designation means (32) is affixed to said stopper lid (3), said designation means indicates a mathematical value of each cube placed in a given column; such that addition and subtraction functions are performed by transferring cubes (1) between said columns.

2. The multi-function teaching game box as claimed in claim 1 wherein:

said number of columns is five.

3. The multi-function teaching game box as claimed in claim 1 wherein:

each said cube (1) includes a depression in a central area of one side.

* * * * *